(12) United States Patent
Chiproot

(10) Patent No.: US 12,044,340 B2
(45) Date of Patent: Jul. 23, 2024

(54) PIPE COUPLING FOR LARGE PIPE DIAMETERS WITH RADIAL FORCE GRIPPERS

(71) Applicant: Krausz Industries Ltd., Rosh HaAyin (IL)

(72) Inventor: Avi Chiproot, Kfar-Saba (IL)

(73) Assignee: Krausz Industries Ltd., Rosh HaAyin (IL)

( * ) Notice: Subject to any disclaimer, the term of this patent is extended or adjusted under 35 U.S.C. 154(b) by 42 days.

(21) Appl. No.: 17/895,094

(22) Filed: Aug. 25, 2022

(65) Prior Publication Data

US 2024/0068608 A1 Feb. 29, 2024

(51) Int. Cl.
*F16L 25/06* (2006.01)
*F16L 17/06* (2006.01)
*F16L 23/08* (2006.01)
*F16L 23/22* (2006.01)

(52) U.S. Cl.
CPC ............... *F16L 23/22* (2013.01); *F16L 23/08* (2013.01)

(58) Field of Classification Search
CPC ......... F16L 17/00; F16L 17/06; F16L 17/067; F16L 17/03; F16L 17/032; F16L 17/04; F16L 23/08; F16L 23/16; F16L 23/22; F16L 23/18; F16L 25/04; F16L 25/06; F16L 25/065; F16L 25/08; F16L 21/02; F16L 21/022; F16L 21/03; F16L 21/04; F16L 21/08

See application file for complete search history.

(56) References Cited

U.S. PATENT DOCUMENTS

2013/0154259 A1* 6/2013 Chiproot ............... F16L 21/065
285/337

* cited by examiner

*Primary Examiner* — Aaron M Dunwoody
(74) *Attorney, Agent, or Firm* — Dekel Patent Ltd.; David Klein

(57) ABSTRACT

A pipe coupling includes two or more partially annular clamp housings, each of which includes two opposing clamp members and one or more tightening elements for tightening the clamp members towards each other in a direction transverse to an axial length of the annular clamp housings. An elastomeric seal assembly is located in seal housings at opposite axial ends of a cylindrical shell. Tightening the clamp members towards each other causes the elastomeric seal assembly to apply a radially-inward clamping force on a pipe or pipes clamped by the pipe coupling. Radial force grippers are spaced about a circumference of each of the annular clamp housings. Radially-inward forces of the radial force grippers create axially-directed forces on the pipe or pipes clamped by the pipe coupling.

5 Claims, 5 Drawing Sheets

PIPE COUPLING FOR LARGE PIPE DIAMETERS WITH RADIAL FORCE GRIPPERS

FIELD OF THE INVENTION

The present invention relates generally to pipe couplings (or clamps), and particularly to a pipe coupling for large pipe diameters with radial force grippers spaced about the circumference of the pipe coupling.

BACKGROUND OF THE INVENTION

Many kinds of removable band-type couplings for pipes exist in the art. It is noted that throughout the specification and claims, the term "pipe" encompasses any kind of generally cylindrical object.

Such couplings have an elastomeric seal assembly which is tightened to form a watertight seal against the pipe. Generally there are two elastomeric seal assemblies, such as annular rings, which are axially spaced from one another. The annular rings are placed around the outer circumference of the pipe or pipes and sealed so as to apply radially-inward forces on the outside of the pipe. These radially-inward forces work against hydraulic forces which are directed radially outwards against the annular ring. The radially-inward forces thus prevent liquid leaking past the seal. There are also hydraulic axially-directed forces acting against each of the elastomeric seal assemblies. For relatively small diameter pipes, the radially-inward forces of the annular rings may create axially-directed friction forces which are sufficient to counteract the hydraulic axially-directed forces.

However, for large diameter pipes, such as 26 inch diameter or more, it is very difficult for the annular ring to achieve three goals: 1) elastomeric sealing against liquids; 2) radially-inward forces that are sufficient to counteract the hydraulic forces which are directed radially outwards; and 3) axially-directed friction forces which are sufficient to counteract the hydraulic axially-directed forces.

SUMMARY

The present invention seeks to provide an improved pipe coupling for large pipe diameters with radial force grippers spaced about the circumference of the pipe coupling, as is described more in detail hereinbelow.

There is thus provided in accordance with a non-limiting embodiment of the present invention a pipe coupling including two or more partially annular clamp housings, each of the annular clamp housings including two opposing clamp members and one or more tightening elements for tightening the clamp members towards each other in a direction transverse to an axial length of the annular clamp housings, a cylindrical shell extending between the annular clamp housings, seal housings located at opposite axial ends of the cylindrical shell, an elastomeric seal assembly located in each of the seal housings, wherein tightening the clamp members towards each other causes the elastomeric seal assembly to apply a radially-inward clamping force on a pipe or pipes clamped by the pipe coupling, and radial force grippers spaced about a circumference of each of the annular clamp housings, wherein radially-inward forces of the radial force grippers create axially-directed forces on the pipe or pipes clamped by the pipe coupling.

BRIEF DESCRIPTION OF THE DRAWINGS

The present invention will be understood and appreciated more fully from the following detailed description, taken in conjunction with the drawing in which.

DETAILED DESCRIPTION OF EMBODIMENTS

Figure 1A:
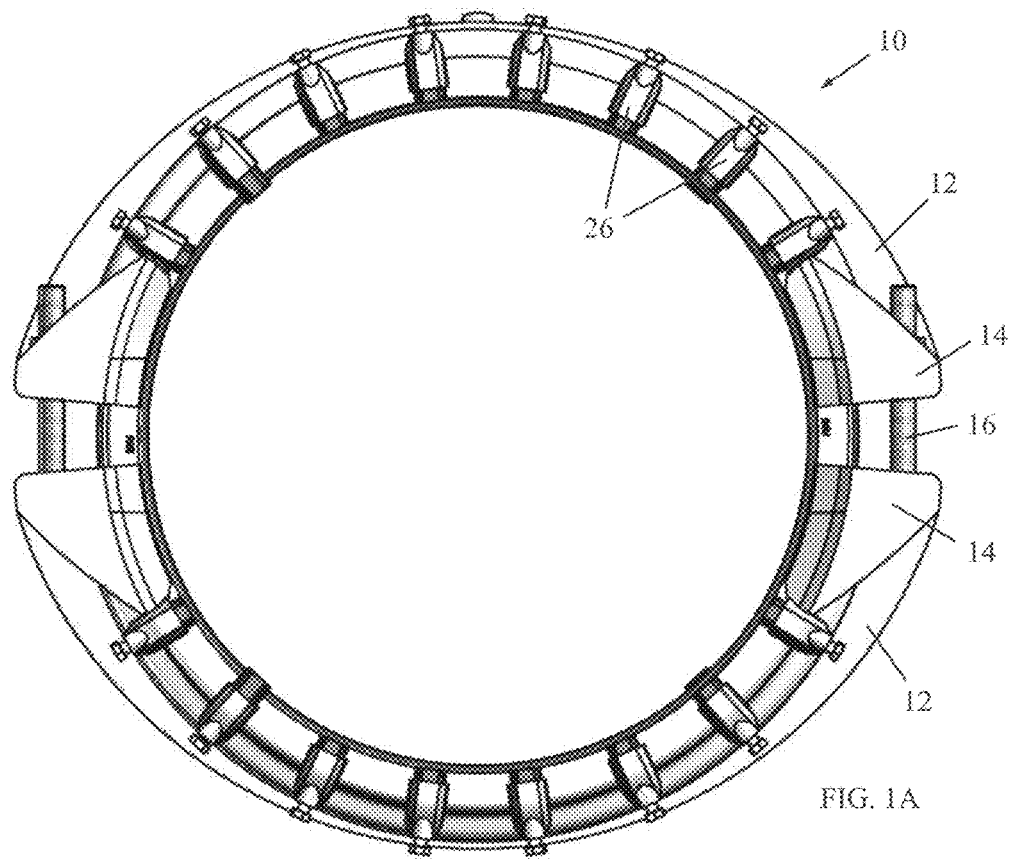
FIGS. 1A, 1B, 1C and 1D are simplified end-face, side-view, top-view and pictorial illustrations, respectively, of a pipe coupling, constructed and operative in accordance with a non-limiting embodiment of the present invention.
Figure 1B:
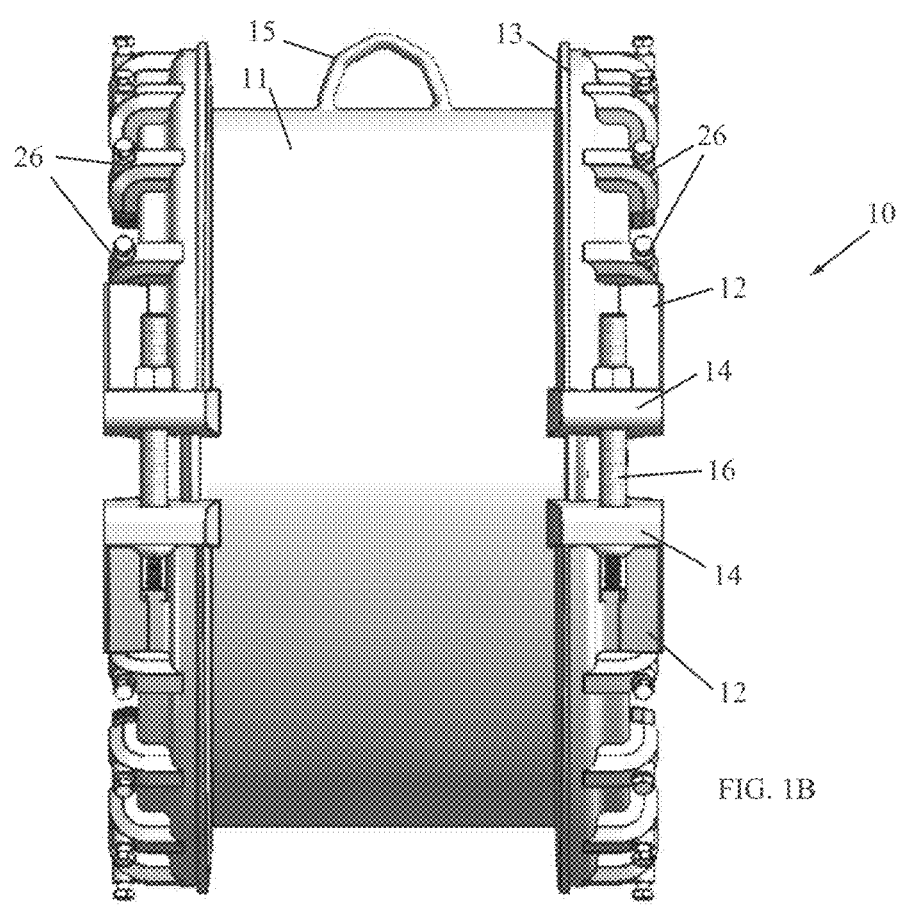

Reference is now made to FIGS. 1A and 1B, which illustrate a pipe coupling 10, constructed and operative in accordance with a non-limiting embodiment of the present invention.

Pipe coupling 10 includes two or more partially annular clamp housings 12 (in the illustrated embodiment there are two, each of which is semi-circular in shape). Each partially annular clamp housing 12 is provided with two opposing clamp members (e.g., flanges) 14 and one or more tightening elements 16 (e.g., bolts with nuts) for tightening the clamp members 14 towards each other in a direction transverse to an axial length of the clamp housings 12 so as to apply a radially-inward clamping force on a pipe or pipes (not shown) clamped by pipe coupling 10.

Figure 1C:
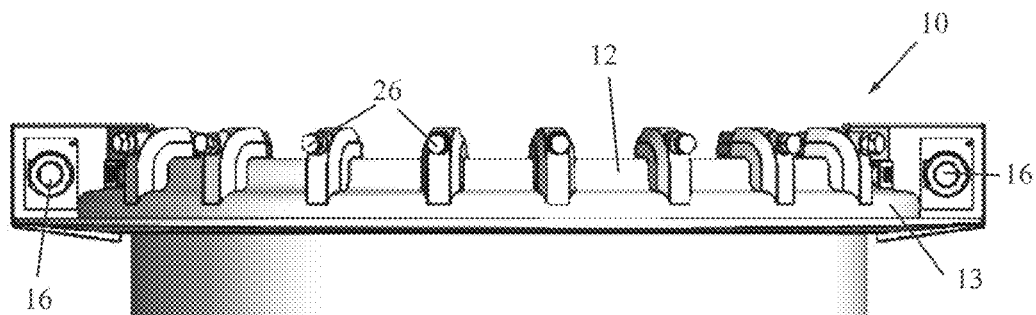
Figure 1C:
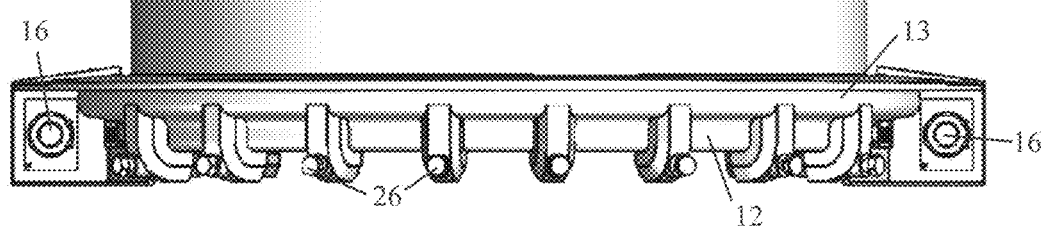
Figure 1D:
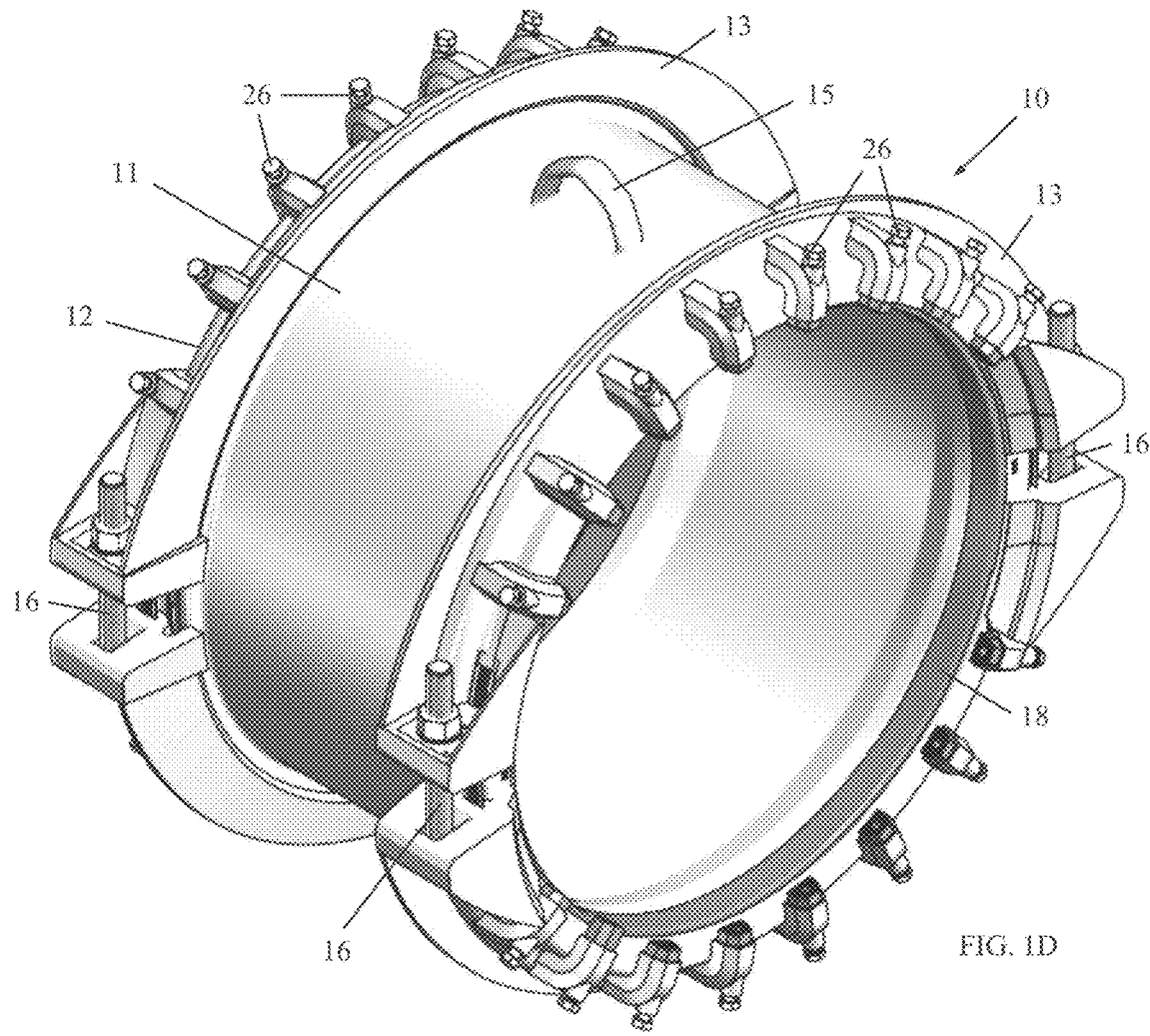

Each partially annular clamp housing 12 includes an elastomeric seal assembly 18 (FIG. 1D). As seen in FIGS. 1C and 1D, two elastomeric seal assemblies 18, axially spaced from one another, may be located in seal housings 13 located at opposite axial ends of a cylindrical shell 11 of the pipe coupling 10. The cylindrical shell 11 may be provided with a handle 15 and extends from the annular clamp housings 12.

Figure 2:
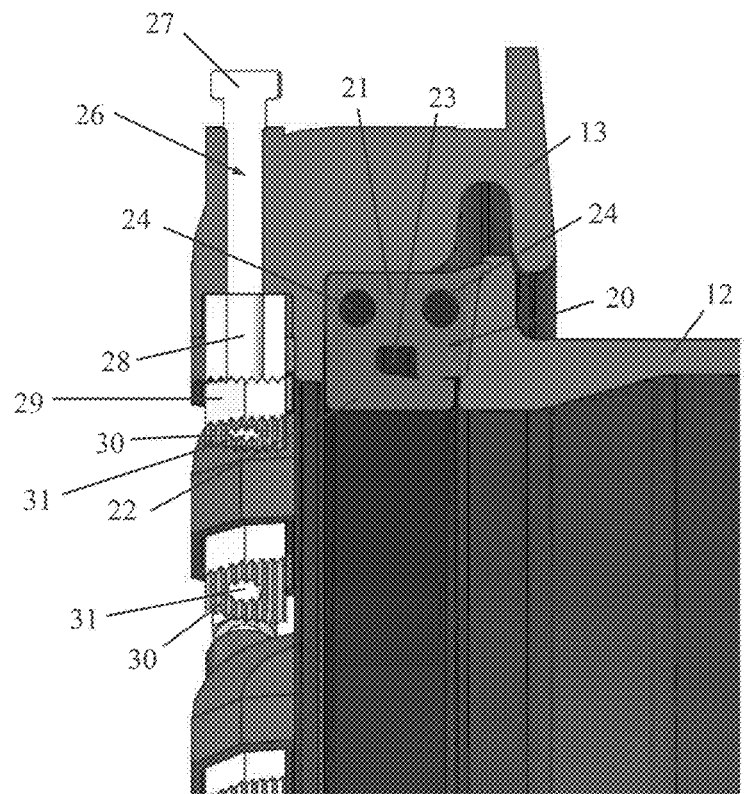
FIG. 2 is a simplified, partially cutaway illustration of the pipe coupling, showing an annular seal for providing radial sealing that counteract any hydraulic radial forces on the pipe coupling, and a radial force gripper for providing axially-directed forces that counteract any hydraulic axial forces on the pipe coupling.
Figure 3A:
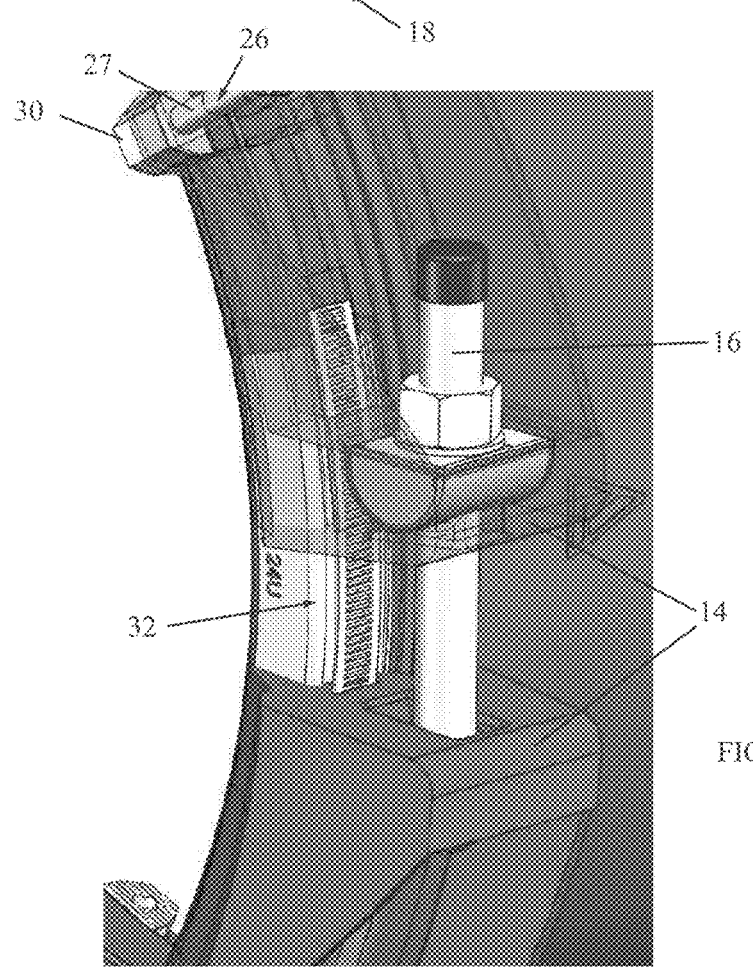
FIGS. 3A, 3B and 3C are simplified enlarged illustrations in different views of a partial annular ratchet rack that cooperates with the annular seal for providing radial sealing that counteract any hydraulic radial forces on the pipe coupling.
Figure 3B:
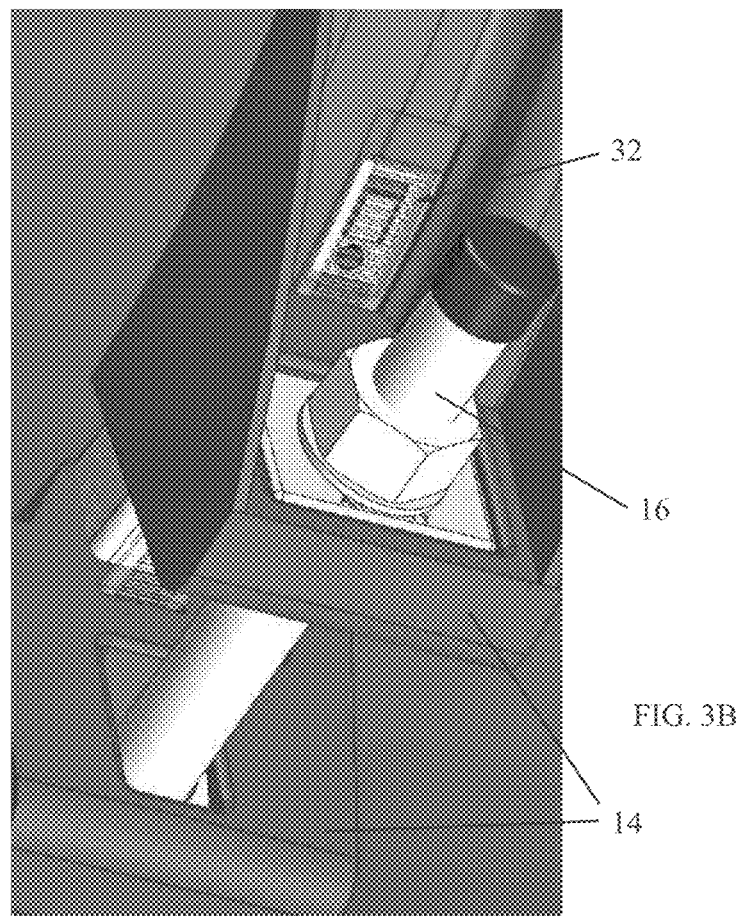
Figure 3C:
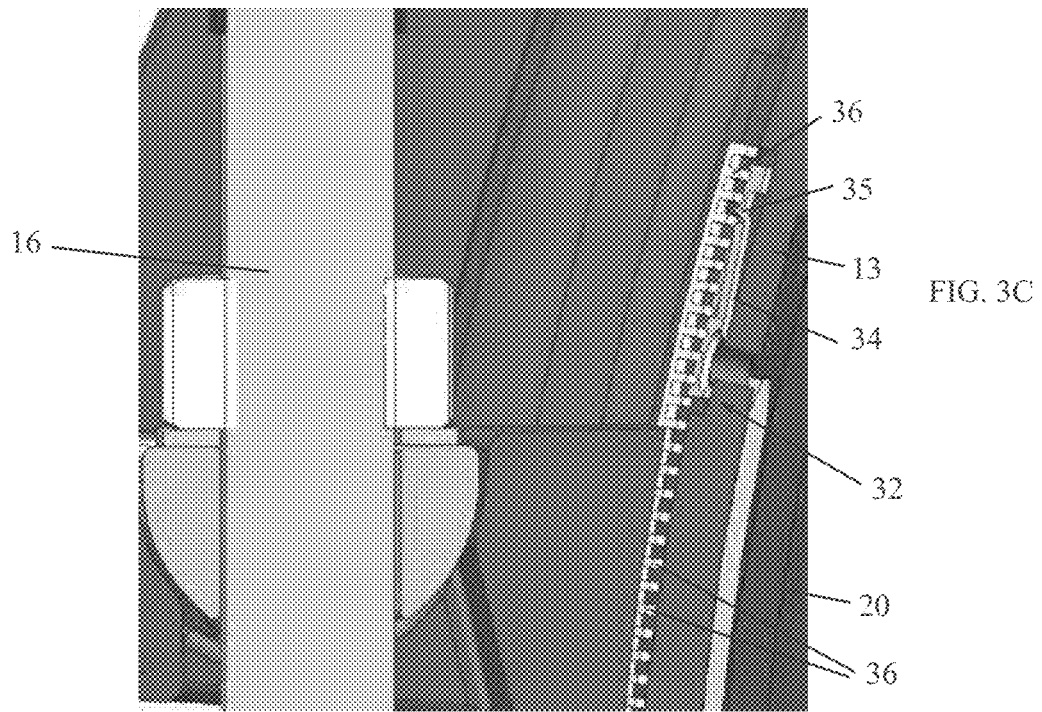
Figure 3D:
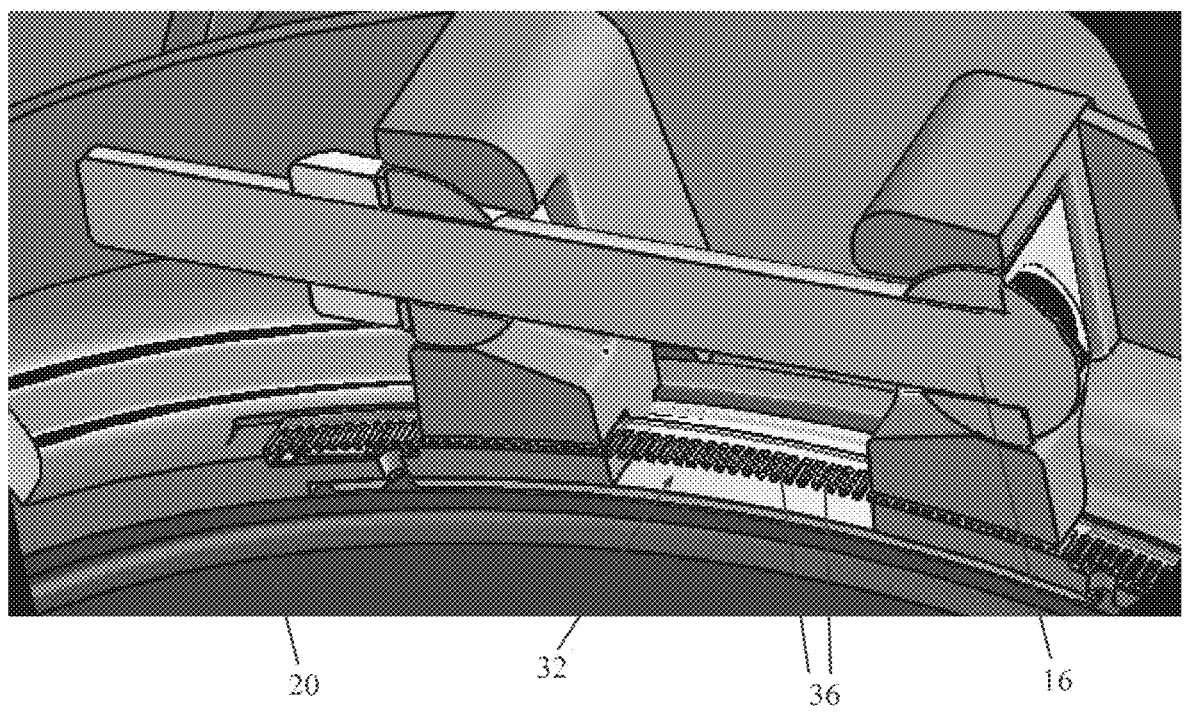
FIG. 3D is a simplified, enlarged sectional illustration of the ratchet rack.

As seen in FIG. 2, each seal assembly 18 includes at least one annular sealing ring 20 constructed with an outer portion 21 folded over an inner portion 22 so as to define at least one annular space 23 between and bounded by the inner and outer portions 21 and 22. The annular space 23 may be in fluid communication with a fluid (e.g., water, not shown) flowing in the pipe or pipes sealed by seal assembly 18. The fluid can enter annular space 23 via one or more apertures (not shown) formed in a side wall of sealing ring 20. The fluid applies pressure in annular space 23 to increase tightening of the seal. Nested sealing rings may be provided to accommodate different pipe diameters. The outer portion 21 of sealing ring 20 (or alternatively the inner portion 22) may be formed with one or more secondary annular chambers 24, into which fluid may flow and further increase tightening of the seal.

Sealing ring 20, without limitation, may be made of a rubber (e.g., EPDM (ethylene propylene diene monomer), butyl, styrene butadiene or neoprene) or a thermoplastic elastomer (e.g., polyurethane or olefin) compatible with the fluid to be carried in the pipe. For example, without limitation, sealing ring 20 may be made of EPDM rubber with 70-80 Shore A durometer.

Each sealing ring 20 may be placed around the outer circumference of the pipe or pipes and sealed by tightening the tightening elements 16 (FIGS. 1A-1D) so as to apply radially-inward forces on the outside of the pipe. These radially-inward forces work against hydraulic forces which are directed radially outwards against the annular sealing ring 20. The radially-inward forces thus prevent liquid leaking past the seal.

As seen in FIGS. 1A-1D, each partially annular clamp housing 12 also includes radial force grippers 26 spaced about the circumference of the clamp housing 12. As seen in FIG. 2, each radial force gripper 26 may include a threaded fastener 27 which has a serrated nut 28 which mates with a serrated portion 29 of an elastomeric pad 30. The elastomeric pad 30 may have a hollow inner portion 31 which can become compressed when tightened against the pipe by tightening threaded fastener 27. It is noted that the radial force grippers 26 are not wedge-type grippers in which the tightening force is not applied radially.

Each radial force gripper 26 provides a radially-inward force against the pipe being clamped by the pipe coupling. The radially-inward forces of the grippers 26 create axially-directed forces which are sufficient to counteract the hydraulic axially-directed forces created by fluid flowing in the pipe being clamped by the pipe coupling. These axially-directed forces may be due to the gripper biting into the pipe material (in which case the gripper end is serrated, for example) and/or may be due to friction forces created by tightening the grippers against the pipe. Thus, in contrast with the prior art, the pipe coupling of the present invention divides the burden of overcoming the radial and axial hydraulic forces between the annular sealing rings 20 and the grippers 26. The annular sealing rings 20 overcome the radial hydraulic forces which are directed radially outwards, while the grippers 26 create axially-directed forces which are sufficient to counteract the hydraulic axially-directed forces. In this manner, the present invention can be used for any size pipes, including large pipes with diameters of 26 inches and more.

Reference is now made to FIGS. 3A-3D. In accordance with a non-limiting embodiment of the present invention, the tightening element 16 for tightening sealing ring may cooperate with a partial annular ratchet rack 32. As seen best in FIG. 3C, the ratchet rack 32 may be coupled to the seal housing 13 and may include a cable-tie (also called zip-tie) structure, including a pawl 34 that has a catch 35 that locks between any two teeth 36 of a row of ratchet teeth 36. The ratchet rack 32 cooperates with the annular seal 20 for providing radial sealing that counteract any hydraulic radial forces on the pipe coupling. Moreover, in a preferred method of using the invention, the sealing ring is first tightened and then afterwards the radial force grippers are tightened. If no ratchet rack were used, the tightening of the radial force grippers may apply forces that tend to undo the hydraulic seal achieved by tightening the sealing ring. With the addition of ratchet rack 32, tightening of the radial force grippers does not burden the tightening elements 16 and the hydraulic seal achieved by tightening the sealing ring is maintained at all times.

What is claimed is:

1. A pipe coupling comprising:
   two or more partially annular clamp housings, each of said annular clamp housings comprising two opposing clamp members and one or more tightening elements for tightening said clamp members towards each other in a direction transverse to an axial length of said annular clamp housings;
   a cylindrical shell extending between said annular clamp housings;
   seal housings located at opposite axial ends of said cylindrical shell;
   an elastomeric seal assembly located in each of said seal housings, wherein tightening said clamp members towards each other causes said elastomeric seal assembly to apply a radially-inward clamping force on a pipe or pipes clamped by said pipe coupling; and
   radial force grippers spaced about a circumference of each of said annular clamp housings, wherein radially-inward forces of said radial force grippers create axially-directed forces on the pipe or pipes clamped by said pipe coupling, and
   wherein each said radical force gripper comprises a threaded fastener which has a serrated nut which mates with an elastomeric pad.

2. The pipe coupling according to claim 1, wherein each said elastomeric seal assembly comprises at least one annular sealing ring constructed with an outer portion folded over an inner portion so as to define at least one annular space between and bounded by said inner and outer portions.

3. The pipe coupling according to claim 1, wherein said elastomeric pad comprises a hollow inner portion.

4. A pipe coupling comprising;
   two or more partially annular clamp housings, each of said annular clamp housings comprising two opposing clamp members and one or more tightening elements for tightening said clamp members towards each other in a direction transverse to an axial length of said annular clamp housings;
   a cylindrical shell extending between said annular clamp housings;
   seal housings located at opposite axial ends of said cylindrical shell;
   an elastomeric seal assembly located in each of said seal housings, wherein tightening said clamp members towards each other causes said elastomeric seal assembly to apply a radially-inward clamping force on a pipe or pipes clamped by said pipe coupling; and
   radial force grippers spaced about a circumference of each of said annular clamp housings, wherein radially-inward forces of said radial force grippers create axially-directed forces on the pipe or pipes clamped by said pipe coupling, and further comprising a ratchet rack coupled to each of said seal housings.

5. The pipe coupling according to claim 4, wherein said ratchet rack comprises a pawl that has a catch that locks between any two teeth of a row of ratchet teeth.

* * * * *